US 10,455,149 B2

(12) United States Patent
Nakayama

(10) Patent No.: US 10,455,149 B2
(45) Date of Patent: Oct. 22, 2019

(54) IMAGE PROCESSING APPARATUS, IMAGE PROCESSING APPARATUS CONTROL METHOD, IMAGE PICKUP APPARATUS, AND IMAGE PICKUP APPARATUS CONTROL METHOD

(71) Applicant: CANON KABUSHIKI KAISHA, Tokyo (JP)

(72) Inventor: Fumitaka Nakayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/872,465

(22) Filed: Jan. 16, 2018

(65) Prior Publication Data
US 2018/0146135 A1    May 24, 2018

Related U.S. Application Data

(62) Division of application No. 14/821,091, filed on Aug. 7, 2015.

(30) Foreign Application Priority Data

Aug. 20, 2014 (JP) ................................ 2014-167479

(51) Int. Cl.
H04N 5/232    (2006.01)
H04N 13/128   (2018.01)
(Continued)

(52) U.S. Cl.
CPC ......... H04N 5/23229 (2013.01); G06T 7/571 (2017.01); H04N 5/23212 (2013.01);
(Continued)

(58) Field of Classification Search
None
See application file for complete search history.

(56) References Cited

U.S. PATENT DOCUMENTS

2006/0050383 A1*  3/2006  Takemoto ............ H04N 13/194
                                                    359/462
2013/0050429 A1   2/2013  Suzuki et al.
(Continued)

FOREIGN PATENT DOCUMENTS

JP    2008-015754 A    1/2008
JP    2009-162748 A    7/2009
(Continued)

OTHER PUBLICATIONS

Jan. 4, 2018 Chinese Office Action, which is enclosed with an English Translation, that issued in Chinese Patent Application No. 201510512743.1.

(Continued)

Primary Examiner — Twyler L Haskins
Assistant Examiner — Dwight Alex C Tejano
(74) Attorney, Agent, or Firm — Cowan, Liebowitz & Latman, P.C.

(57) ABSTRACT

An image processing apparatus including an acquiring unit configured to acquire an image signal of a plurality of images obtained by picking up an object image that is formed by a photographing optical system; a determining unit configured to determine a defocus amount of the object image by using the image signal of the plurality of images; and a conversion unit configured to perform, on the defocus amount, gradation conversion that has at least one conversion characteristic out of a plurality of different conversion characteristics, and to output information that is based on the defocus amount converted by the gradation conversion.

28 Claims, 10 Drawing Sheets

(51) Int. Cl.
*H04N 5/262* (2006.01)
*G06T 7/571* (2017.01)
*H04N 5/369* (2011.01)
*H04N 13/00* (2018.01)

(52) U.S. Cl.
CPC ......... *H04N 5/2621* (2013.01); *H04N 13/128* (2018.05); *G06T 2207/10148* (2013.01); *H04N 5/3696* (2013.01); *H04N 2013/0092* (2013.01)

(56) References Cited

U.S. PATENT DOCUMENTS

| | | | |
|---|---|---|---|
| 2013/0051660 A1* | 2/2013 | Shibuhisa | H04N 13/261 382/154 |
| 2013/0242047 A1 | 9/2013 | Noguchi et al. | |
| 2014/0211045 A1 | 7/2014 | Tanaka | |
| 2014/0313191 A1 | 10/2014 | Bruls et al. | |

FOREIGN PATENT DOCUMENTS

| | | |
|---|---|---|
| JP | 2010-045457 A | 2/2010 |
| JP | 2012-134881 A | 7/2012 |
| JP | 2013-046209 A | 3/2013 |
| JP | 2013-243529 A | 12/2013 |
| JP | 2013-253964 A | 12/2013 |
| WO | 2012/101719 A1 | 8/2012 |
| WO | 2013/064938 A1 | 5/2013 |

OTHER PUBLICATIONS

Feb. 1, 2018 Japanese Office Action, which is enclosed without an English Translation, that issued in Japanese Patent Application No. 2014167479.

Feb. 1, 2018 Japanese Office Action, which is enclosed without and English Translation, that issued in Japanese Patent Application No. 2014-167479.

Jan. 20, 2016 European Search Report, which is enclosed, that issued in European Patent Application No. 15181040.5.

Foreign patent documents were cited in a Aug. 1, 2109 Japanese Office Action, a copy of which is enclosed without an English Translation, that issued in Japanese Patent Application No. 2018-188108.

* cited by examiner

FIG. 3
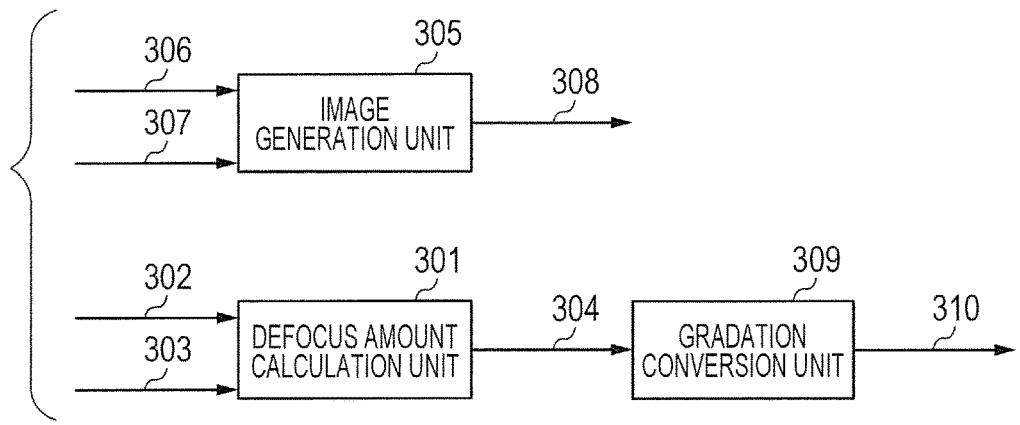
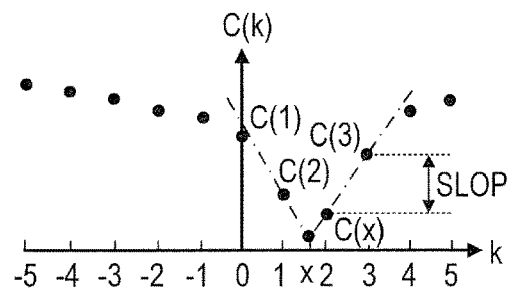
FIG. 4A
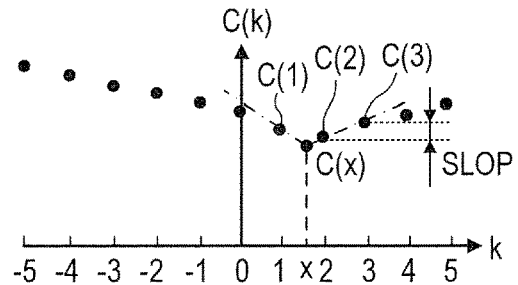
FIG. 4B
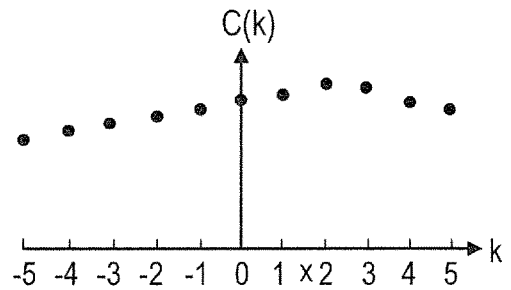
FIG. 4C

LINEAR

NEAR IN-FOCUS
(FAR FOCUS IS GIVEN IMPORTANCE)

NEAR IN-FOCUS

SPECIFIC OBJECT

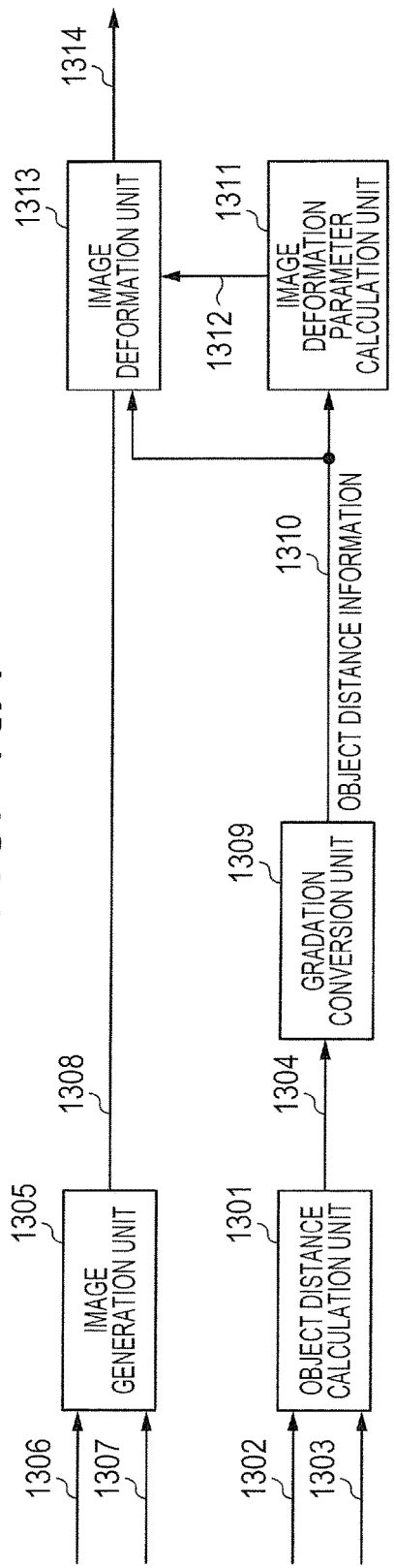
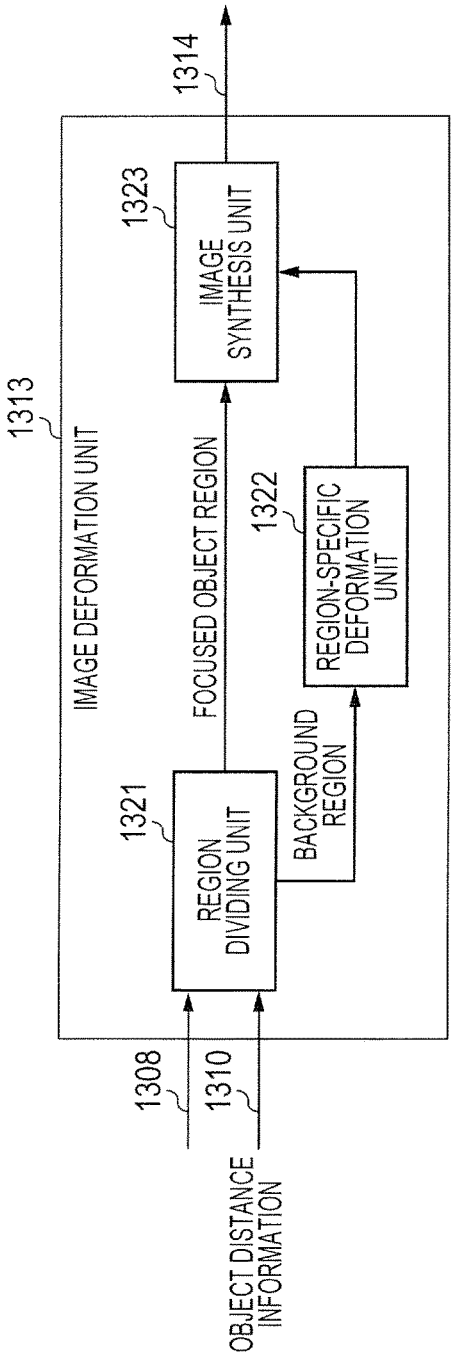
FIG. 13A
FIG. 13B

PHOTOGRAPHED IMAGE  1401

FOCUSED OBJECT IMAGE  1411

BACKGROUND IMAGE  1421

BACKGROUND IMAGE WITH BACKGROUND OBJECTS DEFORMED WITH MAGNIFICATION RATIOS BASED ON DISTANCE

IMAGE PHOTOGRAPHED AT VIRTUAL FOCAL DISTANCE/ CAMERA POSITION

IMAGE PROCESSING APPARATUS, IMAGE PROCESSING APPARATUS CONTROL METHOD, IMAGE PICKUP APPARATUS, AND IMAGE PICKUP APPARATUS CONTROL METHOD

CROSS-REFERENCE TO RELATED APPLICATION

This application is a divisional of application Ser. No. 14/821,091, filed Aug. 7, 2015, the entire disclosure of which is hereby incorporated by reference.

BACKGROUND OF THE INVENTION

Field of the Invention

The present invention relates to an image processing apparatus, an image processing apparatus control method, an image pickup apparatus, and an image pickup apparatus control method.

Description of the Related Art

There has been known a type of image pickup apparatus that uses a pupil division-type phase difference detecting method or a plurality of images different from one another in blurring to detect a defocus amount (the difference between a light receiving plane and an image forming plane of a lens).

A method of calculating the defocus amount from the image deviation amount (parallax amount) of an image is disclosed in Japanese Patent Application Laid-Open No. 2008-15754. An image is divided into minute blocks, a correlation value is calculated by deviating data relative to a pair of pieces of pixel data in one of the minute blocks, and a deviation amount at which the correlation is highest is obtained as the parallax amount. From the calculated deviation amount and a conversion efficient, which is determined based on an image pickup element's pixel pitch and a lens that are used, the defocus amount is calculated with respect to an expected image forming plane of an object image plane.

A method of calculating the defocus amount by Depth from Defocus (DFD) is disclosed in Japanese Patent Application Laid-Open No. 2013-253964. In DFD, a photographing parameter of an image pickup optical system is controlled so as to obtain a plurality of images different from one another in blurring, and the amount of correlation in blurring between a measurement target pixel and its surrounding pixels in the plurality of obtained images is calculated to calculate the defocus amount. The defocus amount calculated by these methods is a distance on the image plane, and object distance information can therefore be calculated further by converting the image plane distance into an object plane distance with the use of the lens equation.

Technologies of applying the defocus amount and the object distance that are calculated by these methods to various types of image processing have been disclosed as well. In Japanese Patent Application Laid-Open No. 2010-45457, face brightness correction includes performing processing in which a correction gain is changed in relation to the defocus amount so that the face in focus has an appropriate brightness. Japanese Patent Application Laid-Open No. 2013-243529 includes performing processing in which an image pickup apparatus uses the object distance to pick up an image of an object when the object is within a prescribed distance from the image pickup apparatus.

SUMMARY OF THE INVENTION

According to an aspect of an embodiment, an image processing apparatus including an acquiring unit configured to acquire an image signal of a plurality of images obtained by picking up an object image that is formed by a photographing optical system; a determining unit configured to determine a defocus amount of the object image by using the image signal of the plurality of images; and a conversion unit configured to perform, on the defocus amount, gradation conversion that has at least one conversion characteristic out of a plurality of different conversion characteristics, and to output information that is based on the defocus amount converted by the gradation conversion.

Further features of the present invention will become apparent from the following description of exemplary embodiments with reference to the attached drawings.

BRIEF DESCRIPTION OF THE DRAWINGS

FIG. 3 is a block diagram of an image processing unit of the image pickup apparatus according to the first embodiment of the present invention.

FIGS. 4A, 4B, and 4C are graphs for showing image deviation amount detection that uses an image having parallax.

FIGS. 13A and 13B are block diagrams of an image processing unit of an image processing apparatus according to a fourth embodiment of the present invention.

DESCRIPTION OF THE EMBODIMENTS

When the calculated defocus amount and object distance are output to the outside of an image pickup apparatus, or output to another module or application within the image pickup apparatus, the distance information needs to be converted before being output, depending on where the distance information is output to. For instance, some need a distance resolution near the in-focus region as in Japanese Patent Application Laid-Open No. 2010-45457, and others need the distance measurement range as in Japanese Patent Application Laid-Open No. 2013-243529. The distance information also needs to be kept under the limit word length of a transmission path that connects to the output destination of the distance information.

Exemplary embodiments of the present invention are described in detail below with reference to the drawings. The following embodiments describe examples of applying an image processing apparatus of the present invention to a digital camera, which is an example of an image pickup apparatus.

[First Embodiment]

Figure 1:
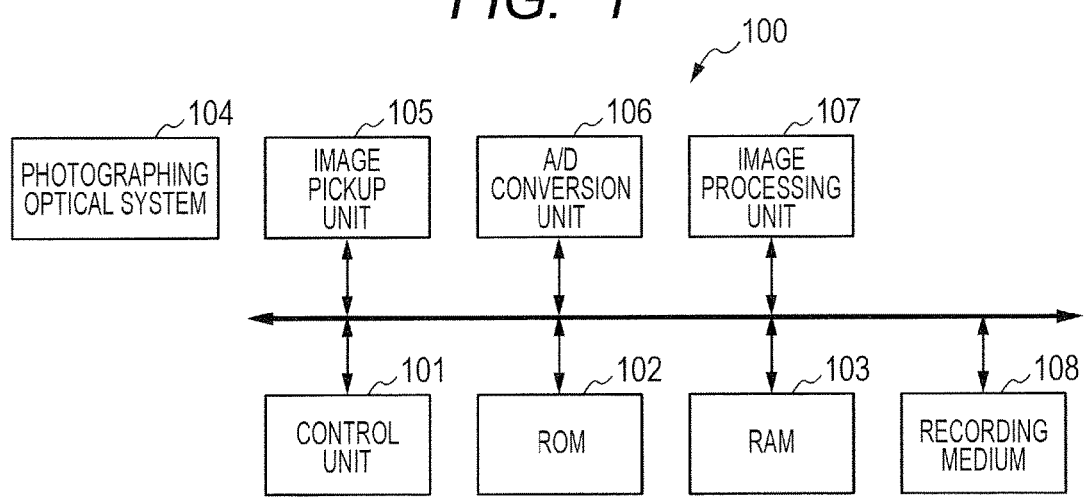
FIG. 1 is a diagram for illustrating the system configuration of an image pickup apparatus to which an image processing apparatus according to a first embodiment of the present invention is applied.

FIG. 1 is a block diagram for illustrating the function configuration of a digital camera as an example of an image pickup apparatus to which an image processing apparatus according to a first embodiment of the present invention is applied. In FIG. 1, a control unit 101 is, for example, a CPU, and controls the operation of blocks that are included in a digital camera 100 by reading the blocks' respective operation programs out of a ROM 102, and deploying the operation programs on a RAM 103 to perform the operation programs. The ROM 102 is a rewritable non-volatile memory, and stores, in addition to the operation programs of the blocks included in the digital camera 100, parameters and other types of information necessary for the operation of the blocks. The RAM 103 is a rewritable volatile memory, and is used as a temporary storage area for data that is output through the operation of the blocks included in the digital camera 100.

A photographing optical system 104 forms an image of an object in an image pickup unit 105. The image pickup unit 105 includes an image pickup element such as a CCD or a CMOS sensor, and outputs, to an A/D conversion unit 106, an analog image signal, which is obtained through photoelectric conversion of an optical image formed in the image pickup element by the photographing optical system 104. The A/D conversion unit 106 performs A/D conversion processing on the input analog image signal, and outputs the resultant digital image data to the RAM 103, where the digital image data is stored.

An image processing unit 107 performs various image processing such as white balance adjustment, color interpolation, reduction/enlargement, and filtering on image data stored in the RAM 103.

A recording medium 108 is a detachable memory card or the like. Images stored in the RAM 103, including an image that has been processed by the image processing unit 107 and an image that has been subjected to A/D conversion by the A/D conversion unit 106, are recorded on the recording medium 108 as recorded images. The image processing unit 107 and the recording medium 108 also handle the generation and recording of a defocus amount and an object distance, which are described later.

Figure 2:
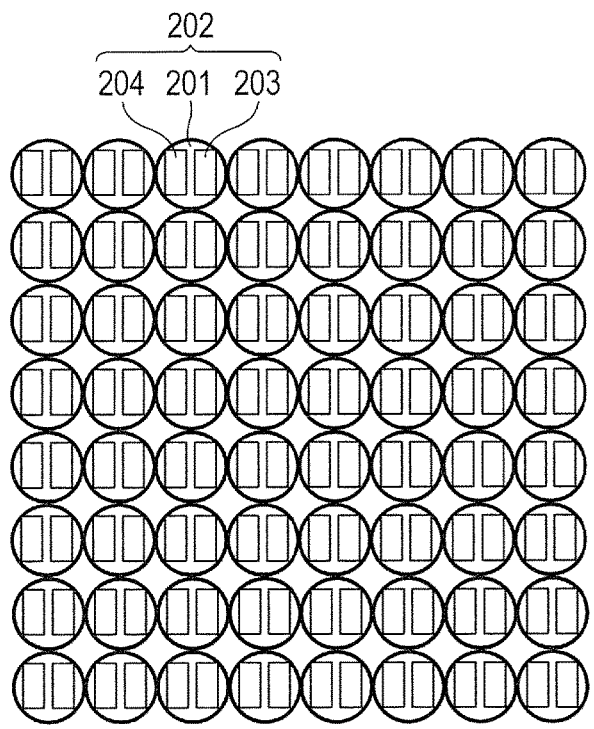
FIG. 2 is a diagram for schematically illustrating a pixel arrangement of an image pickup element in the image pickup apparatus according to the first embodiment of the present invention.
Figure 5A:
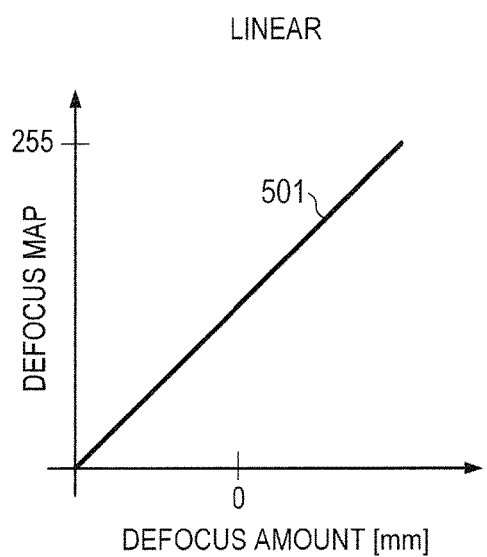
FIGS. 5A, 5B, 5C, and 5D are graphs for showing examples of gradation conversion characteristics in the image pickup apparatus according to the first embodiment of the present invention.
Figure 5C:
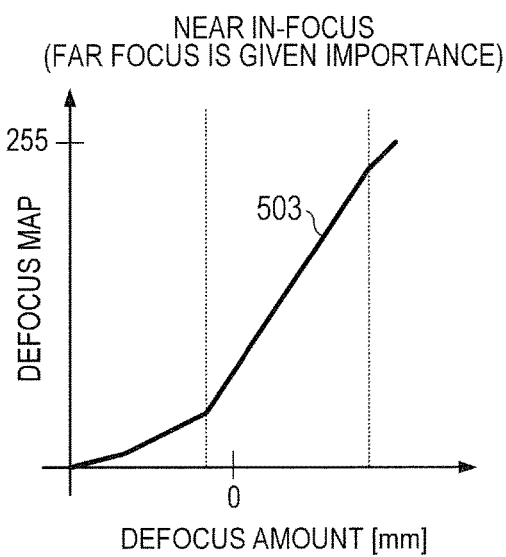
Figure 5B:
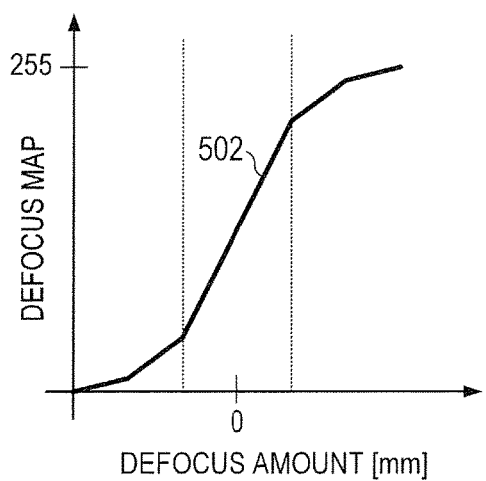
Figure 5D:
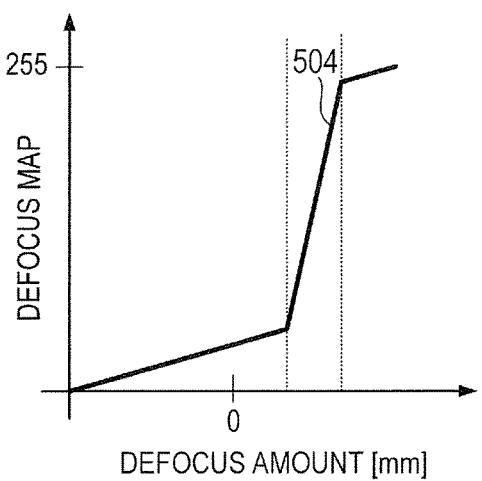

FIG. 2 is a diagram for schematically illustrating the pixel arrangement configuration of the image pickup unit 105 that is included in the digital camera 100 according to this embodiment. The pixel arrangement configuration of FIG. 2 is the same as that of the image pickup element disclosed in Japanese Patent Application Laid-Open No. 2008-15754. In FIG. 2, each unit pixel 202 includes a micro lens 201 and a pair of photoelectric converters 203 and 204. The photoelectric converters (divided pixels) 203 and 204 receive luminous fluxes via the micro lens (pupil dividing unit) 201 from different pupil regions of an exit pupil of the photographing optical system 104. In the image pickup unit 105 of FIG. 1 where the unit pixels 202 are arranged two-dimensionally and orderly, an image signal of an image is generated from a luminous flux that has passed through a pupil division region associated with, for example, the divided pixel 203 by collecting the photoelectric conversion output of the divided pixel 203 from each unit pixel 202. Similarly, an image signal of an image is generated from a luminous flux that has passed through another pupil division region, which is associated with the other divided pixel 204, by collecting the photoelectric conversion output of the divided pixel 204. The image pickup unit 105 can acquire a pair of image signals having parallax in this manner. In this embodiment, an image picked up by the photoelectric converter 203 is referred to as image A and an image picked up by the photoelectric converter 204 is referred to as image B.

FIG. 3 is a diagram for illustrating an image generation unit, a defocus amount calculation unit, and a gradation conversion unit in the image processing unit 107 of the digital camera to which the image processing apparatus according to this embodiment is applied.

The image generation unit 305 adds together a plurality of object images formed from luminous fluxes that arrive from different regions of the pupil of the photographing optical system 104 (the image A and the image B in this embodiment), and generates an image corresponding to a single object image that is generated from luminous fluxes arriving from all regions of the pupil of the photographing optical system 104. The image A that is denoted by 306 and the image B that is denoted by 307 are input to the image generation unit 305, and the image generation unit 305 outputs an image 308. The image 308 generated by the image generation unit 305 receives further image processing such as white balance adjustment, color interpolation, reduction/enlargement, and filtering, and the processed image is recorded on the recording medium 108 of FIG. 1 as a recorded image.

The defocus amount calculation unit, which is denoted by 301, is configured to calculate a defocus amount at a target pixel position. The image A that is denoted by 302 and the image B that is denoted by 303 are input to the defocus amount calculation unit 301, and the defocus amount calculation unit 301 outputs a defocus amount 304. The defocus amount calculation unit 301 calculates the defocus amount by calculating a correlation function of correlation between the image A and the image B, or by other methods.

Processing of calculating the correlation function is described. The processing of calculating the defocus amount from the correlation function can use a method disclosed in Japanese Patent Application Laid-Open No. 2008-15754. Concrete processing of the calculation is described with reference to FIGS. 4A to 4C. In each of FIGS. 4A to 4C, the axis of abscissa represents the image deviation amount and the axis of ordinate represents the amount of correlation between images that is expressed by Expression (1). FIG. 4A is an example in which the degree of correlation is high. FIGS. 4B and 4C are examples in which the degree of correlation is low.

According to Japanese Patent Application Laid-Open No. 2008-15754, a pair of pieces of pixel data in one minute block are expressed in a generalized form as (E(1) to E(m)) and (F(1) to F(m)) (m represents the number of data pieces). The data series (F(1) to F(m)) is deviated relative to the data series (E(1) to E(m)) to calculate, by Expression (1), a correlation amount C(k) between the two data series at an image deviation amount k.

$$C(k) = \Sigma |E(n) - F(n+k)| \quad (1)$$

In Expression (1), $\Sigma$ operation is calculated for n. Values that n and n+k can take in this operation are limited to a range of 1 to m. The image deviation amount k is an integer, and indicates the amount of relative shift between images.

The calculation result of Expression (1) is as shown in FIG. 4A, and the correlation amount C(k) is smallest at a shift amount where correlation between a pair of data series is high (the degree of correlation is higher when the correlation amount is smaller). Subsequently, three-point interpolation by Expressions (2) to (5) is used to obtain a shift amount x that gives a minimum value C(x) for successive correlation amounts.

$$x = kj + D/SLOP \quad (2)$$

$$C(x) = C(kj) - |D| \quad (3)$$

$$D = \{C(kj-1) - C(kj+1)\}/2 \quad (4)$$

$$SLOP = MAX\{C(kj+1) - C(kj), C(kj-1) - C(kj)\} \quad (5)$$

The shift amount x obtained by Expression (2) can be used to obtain a defocus amount DEF with respect to an expected image forming plane of an object image plane by Expression (6).

$$DEF = KX \cdot PY \cdot x \quad (6)$$

Figure 6:
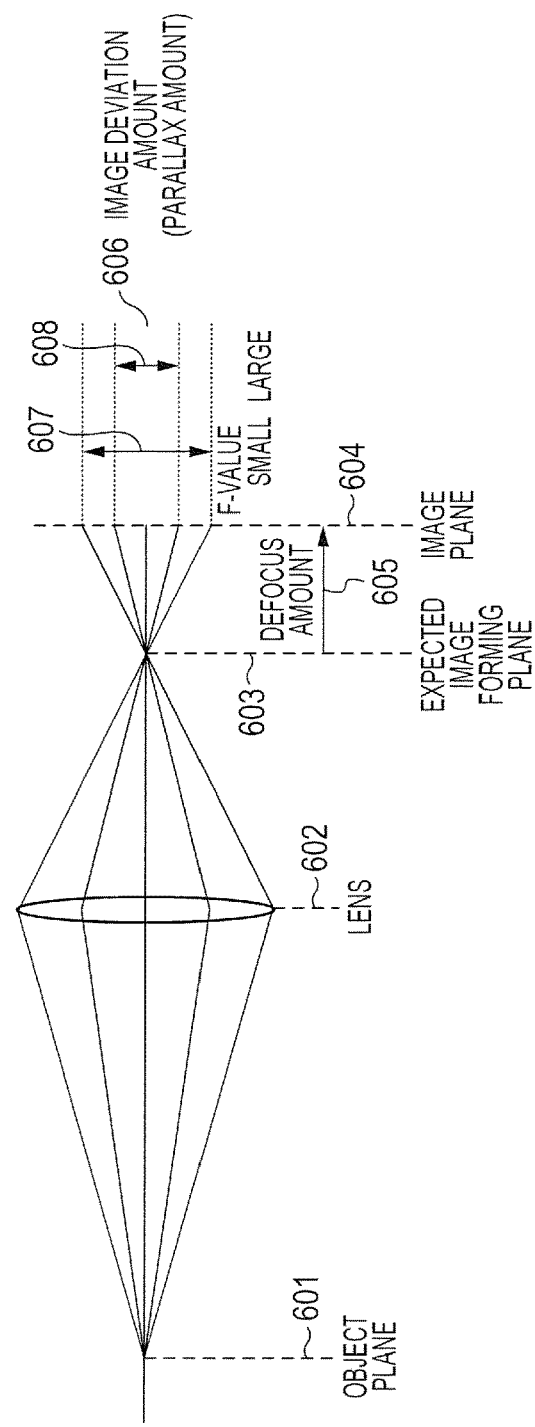
FIG. 6 is a diagram for illustrating the relation between an F-value, an image deviation amount, and a defocus amount.

In Expression (6), PY represents the pixel pitch of the image pickup element (the distance between pixels that constitute the image pickup element), and KX represents a conversion coefficient that is determined based on the magnitude of the divergence angle at the barycenter of luminous fluxes that pass through a pair of distance measurement pupils. The unit of the conversion coefficient is mm/pix. The magnitude of the divergence angle at the barycenter of luminous fluxes that pass through a pair of distance measurement pupils varies depending on the size of the diaphragm opening (F-value) of the lens, and is therefore determined based on lens information. The details of this relation are described with reference to FIG. 6. FIG. 6 is a diagram for illustrating the relation between the defocus amount with respect to the expected image forming plane, the F-value, and the image deviation amount. Illustrated in FIG. 6 are an object plane 601 of an image pickup object, a lens 602, an expected image forming plane 603 of the image pickup element, and an image plane 604, which is located at a position of defocus by a defocus amount 605 from the expected image forming plane 603. Image deviation amounts 607 and 608, which are in relation to the F-value, are also illustrated in FIG. 6. Specifically, the image deviation amount 607 is observed when the F-value is small (the diaphragm opening is wide), and the image deviation amount 608 is observed when the F-value is large (the diaphragm opening is narrow). It is understood from FIG. 6 that the image deviation amount with respect to the image plane at a defocused position is larger when the diaphragm opening is wider and smaller when the diaphragm opening is narrower. In other words, the image deviation amount varies depending on the F-value even at the same defocus amount. This is why the image deviation amount is multiplied by KX, which is a gain that is in relation to the F-value, when the defocus amount is calculated from the image deviation amount.

Whether or not the calculated defocus amount DEF is reliable is determined as follows. When the degree of correlation between a pair of data series is low, the minimum value C(x) of the interpolated correlation amount is large as shown in FIG. 4B. The reliability is therefore determined as low when C(x) is equal to or more than a prescribed value. Alternatively, the reliability is determined as low when a value that is obtained by normalizing C(x) with the contrast of data is equal to or more than a prescribed value. The normalization is accomplished by dividing C(x) by an SLOP value that is in proportion to the contrast. In the case where an SLOP value that is in proportion to the contrast is equal to or less than a prescribed value, it is determined that the object is low in contrast and the reliability of the calculated defocus amount DEF is low.

When the degree of correlation between a pair of data series is low and the correlation amount C(k) does not drop in a prescribed shift range of from k min to k max as shown in FIG. 4C, the minimum value C(x) cannot be obtained. In such cases, it is determined that the image deviation amount cannot be detected. In the case where the image deviation amount can be detected, the defocus amount is calculated by Expression (6).

The sum of absolute differences (SAD) between pixels is used for the correlation function in Japanese Patent Application Laid-Open No. 2008-15754. However, this embodiment is not limited thereto. For example, the sum of squared differences (SSD) or normalized cross correlation (NCC) between pixels may be used. The NCC value is larger when the degree of correlation is higher, whereas the SAD value and the SSD value are smaller when the degree of correlation is higher. Other than SAD and NCC, any correlation operation expression that calculates the degree of match between a pair of object images can be used.

As illustrated in FIG. 3, the defocus amount 304 output from the defocus amount calculation unit 301 is input to the gradation conversion unit 309. When the defocus amount 304 is output, the gradation conversion unit 309 performs data conversion suitable for where the defocus amount 304 is output to, or for a standard that is used. The gradation conversion unit 309 outputs a defocus amount 310 on which gradation conversion has been performed (the output is referred to as "defocus map output"). The gradation conversion is described with reference to FIGS. 5A to 5D on the premise that an interface to the defocus amount output destination uses 8-bit (0 to 255) gradation in this embodiment. FIGS. 5A to 5D are graphs for showing the characteristics of conversion from the defocus amount to the defocus map in the gradation conversion unit 309. The axis of abscissa represents the defocus amount and the axis of ordinate represents the defocus map in each of the graphs. An object for which a defocus amount of 0 [mm] is detected is a focused object. A positive defocus amount indicates an object that is in front of the focused object, and the distance from the focused object toward the near side grows when the defocus amount increases in the positive direction. A negative defocus amount indicates an object that is behind the focused object, and the distance from the focused object toward the far side grows when the defocus amount increases in the negative direction. In conversion characteristics 501 of FIG. 5A, linear gradation conversion is performed on the defocus amount 304. In conversion characteristics 502 of FIG. 5B, on the other hand, non-linear gradation conversion is performed on the defocus amount 304 so that more bits are allocated to a defocus amount around 0 [mm], which is near an in-focus region, than in other regions. In the case where the output destination of the defocus amount is an application that requires a wide distance measurement range as in Japanese Patent Application Laid-Open No. 2013-243529, linear gradation conversion having the conversion characteristics 501 or the like is performed to allocate bits equally to any defocus amount. In the case where the output destination of the defocus amount is an application that requires distance resolution near the in-focus region as in Japanese Patent Application Laid-Open No. 2010-45457, on the other hand, non-linear gradation conversion having the conversion characteristics 502 or the like is performed to allocate more bits to a defocus amount near the in-focus region than in other regions. The non-linear characteristics of the conversion characteristics 502 is merely an example, and the gradation conversion may have non-linear characteristics that are asymmetrical with respect to a defocus amount of 0 [mm], such as conversion characteristics 503 of FIG. 5C (more bits are allocated to an object that is behind the focused object than to an object that is in front of the focused object). Conversion characteristics 504 of FIG. 5D or the like may also be used in the case of an application that needs the defocus amount of a specific object (for example, an object specified by a user).

These candidates for gradation conversion characteristics to be employed by the gradation conversion unit 309 may be stored in advance in the ROM 102 as table data that holds an output destination or a standard and gradation conversion characteristics in association with them. Alternatively, the gradation conversion characteristics candidates may be received from an external apparatus that is the output destination of the defocus amount, such as a PC, a printer, or a mobile device, while the digital camera 100 is connected to the external apparatus, or from a server while the digital camera 100 is connected to the server. In the case where a standard is selected, gradation conversion characteristics candidates that are associated with different standards may be stored in the ROM 102 in advance. The gradation conversion characteristics that are employed by the gradation conversion unit 309 may be generated each time gradation conversion is performed, based on information about object detection, about the output destination of the defocus amount, or about the standard that is used. An output destination or a standard to which the gradation conversion characteristics are to be adapted is selected from a plurality of output destination candidates stored in advance in the ROM 102, or is determined based on information about the external apparatus given above, or about a server connected to the digital camera 100, such as an output bit count or a standard that is associated with the external apparatus or the server, by obtaining the information from the external apparatus or the server while the digital camera 100 is connected to the external apparatus or the server.

Figure 8:
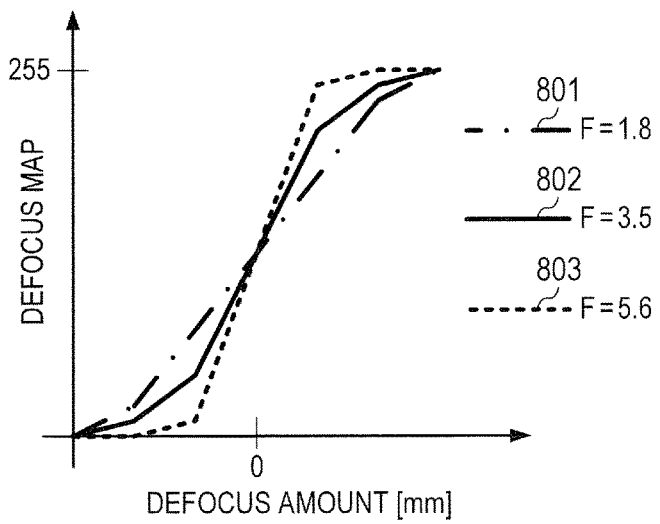
FIG. 8 is a graph for showing another example of the gradation conversion characteristics in the image processing apparatus according to the first embodiment of the present invention.

As described in the description of Expression (6), the image deviation amount is multiplied by the gain KX, which is in relation to the F-value, when the defocus amount is calculated from the image deviation amount. The gradation characteristics can therefore be varied depending on the F-value. This adjustment is described with reference to FIG. 8. FIG. 8 is a graph for showing the characteristics of conversion from the defocus amount to the defocus map as FIGS. 5A to 5D are. The conversion characteristics of FIG. 8 are linear gradation conversion characteristics that are adjusted based on the F-value. Shown in FIG. 8 are gradation characteristics 801 at an F-value of 1.8, gradation characteristics 802 at an F-value of 3.5, and gradation characteristics 803 at an F-value of 5.6. Image deviation that is generated at the same defocus amount is larger in amount when the F-value is smaller, and a smaller F-value therefore means a wider distance measurement range. Accordingly, the gradation characteristics 801 (F=1.8) are close to linear characteristics and, when the conversion characteristics are close to the gradation characteristics 802 (F=3.5) and the gradation characteristics 803 (F=5.6), fewer bits are allocated to a larger defocus amount. The F-value is not the only cause of fluctuations in distance measurement range, and the base length at the time images are obtained is another factor for the fluctuations. A longer base length means greater parallax and a wider distance measurement range, and the gradation characteristics can therefore be varied depending on the base length. In the case where the distance measurement range or the distance measurement resolution varies depending on a photographing condition such as the ISO sensitivity of the image pickup element, gradation characteristics associated with the photographing condition may be used.

Figure 11:
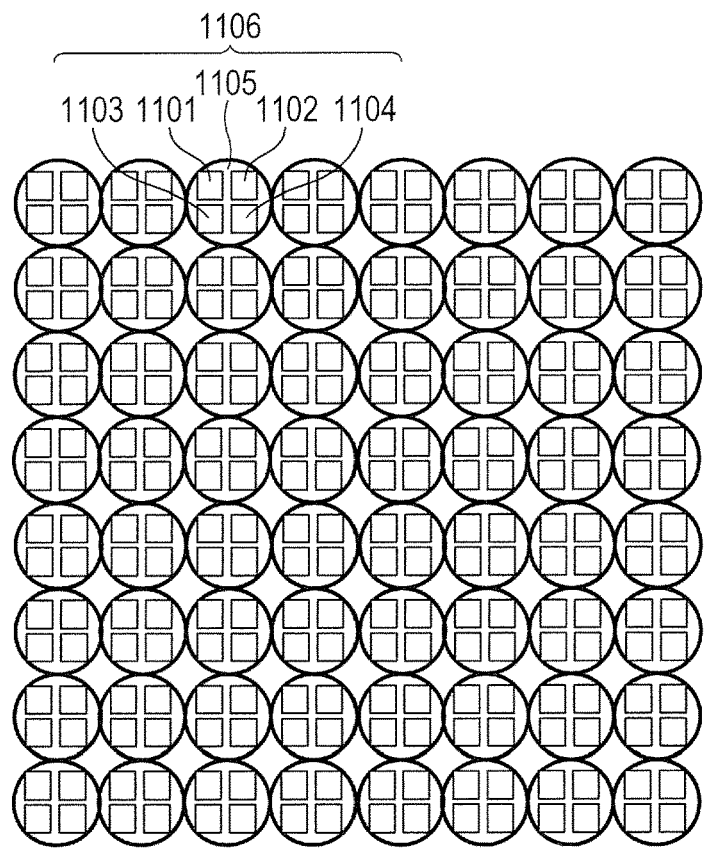
FIG. 11 is a diagram for illustrating another example of the pixel arrangement of the image pickup element.

The image pickup unit (sensor) 105 of the image pickup apparatus configured to acquire image signals having parallax is not limited to the pixel arrangement of FIG. 2, and may have a pixel arrangement structure illustrated in FIG. 11. In FIG. 11, each pixel 1106 includes a micro lens 1105 and two pairs of photoelectric converters, 1101 and 1104, and 1102 and 1103. The pixels 1106 are arranged two-dimensionally and orderly in the image pickup unit 105. The photoelectric converter 1101 picks up an image A. The photoelectric converter 1102 picks up an image B. The photoelectric converter 1103 picks up an image C. The photoelectric converter 1104 picks up an image D. An image and a defocus map are generated from the image A, the image B, the image C, and the image D as in FIG. 3.

While an example of using a pupil division image pickup element is used for the defocus amount calculation has been described here, the defocus amount calculation is not limited thereto. The defocus amount may be calculated with the use of images that are acquired from a compound-eye camera in which lenses and an image pickup element are arranged in stereo. DFD described in Japanese Patent Application Laid-Open No. 2013-253964 and related art may be used instead of calculating the defocus amount from the image deviation amount of an image. In DFD, the defocus amount is calculated from a blurring evaluation value, which is based on the powers of a plurality of images different from one another in blurring.

According to this embodiment, it is therefore possible to provide the image processing apparatus and the image pickup apparatus capable of, when a defocus amount is output, outputting a defocus amount that has gradation characteristics suited to the output destination of the defocus amount. According to this embodiment, the defocus amount output by the image processing apparatus and the image pickup apparatus can therefore be used favorably where the defocus amount is output to.

[Second Embodiment]

A digital camera as an image pickup apparatus to which an image processing apparatus according to a second embodiment of the present invention is applied is described below. The configuration and the image pickup element of the digital camera as an example of the image pickup apparatus in this embodiment are the same as those described in the first embodiment with reference to FIGS. 1 and 2, and a description thereof is omitted here unless it is necessary. The second embodiment differs from the first embodiment in that output information of the gradation conversion unit is the object distance (object plane distance).

Figure 7:
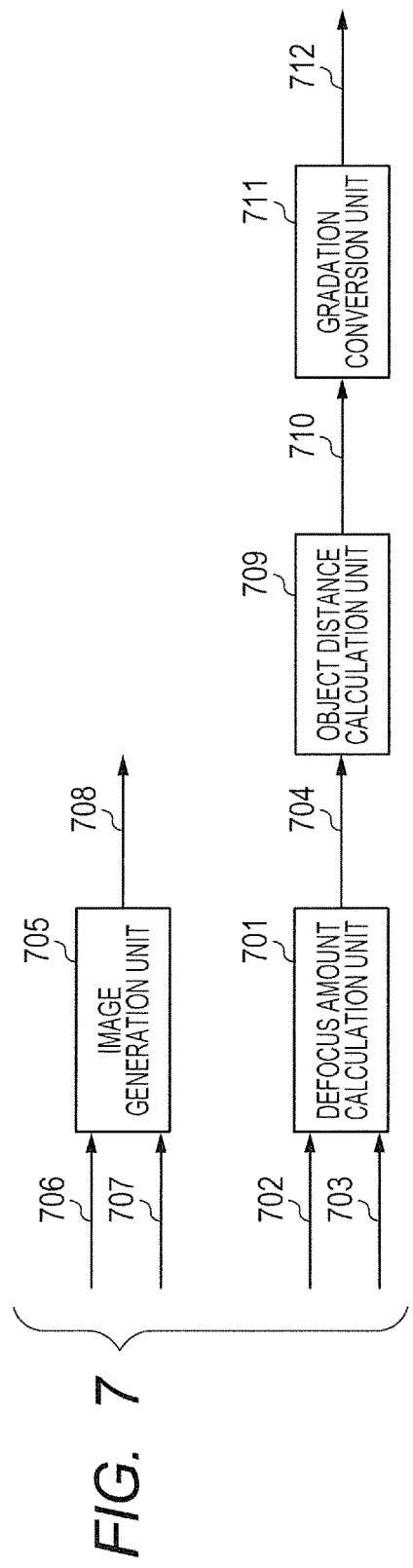
FIG. 7 is a block diagram of an image processing unit of an image processing apparatus according to a second embodiment of the present invention.
Figure 9:
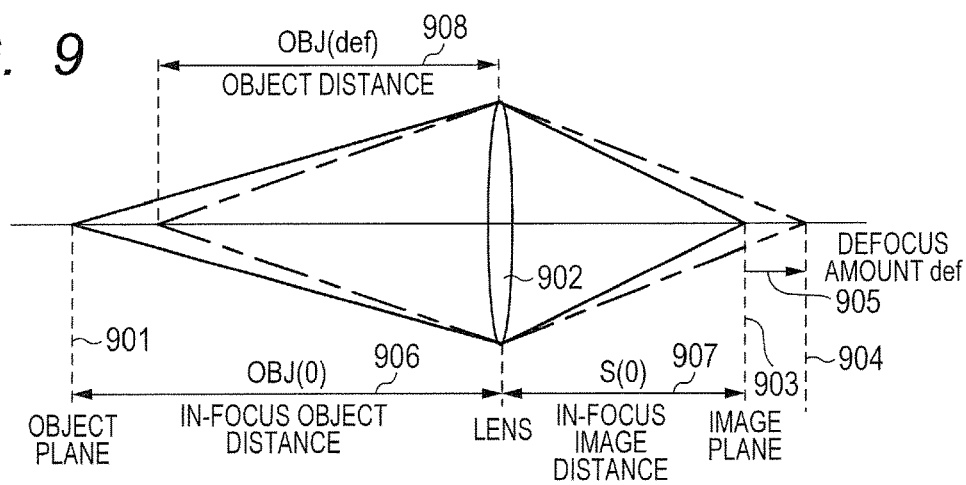
FIG. 9 is a diagram for illustrating the relation between an image pickup plane distance and an object plane distance.

FIG. 7 is a diagram for illustrating an image generation unit, a defocus amount calculation unit, an object distance calculation unit, and a gradation conversion unit in the image processing unit 107 of the digital camera 100 to which the image processing apparatus according to this embodiment is applied. The image generation unit 705 adds together a plurality of object images formed from luminous fluxes that arrive from different regions of the pupil of the photographing optical system, and generates a single object image that is generated from luminous fluxes arriving from all regions of the pupil of the photographing optical system. An image A that is denoted by 706 and an image B that is denoted by 707 are input to the image generation unit 705, and the image generation unit 705 outputs an image 708. The image 708 generated by the image generation unit 705 receives further processing such as white balance adjustment, color interpolation, reduction/enlargement, and filtering. The processed image is recorded on the recording medium 108 of FIG. 1 as a recorded image. The defocus amount calculation unit 701 is configured to calculate a defocus amount at a target pixel position. The image A that is denoted by 702 and the image B that is denoted by 703 are input to the defocus amount calculation unit 701, and the defocus amount calculation unit 701 outputs a defocus amount 704. The defocus amount calculation unit 701 calculates the defocus amount by calculating a correlation function of correlation between the image A and the image B, or by other methods. The defocus amount is calculated through the same processing that has been described above. The defocus amount 704 calculated by the defocus amount calculation unit 701 is input to the object distance calculation unit 709. The object distance calculation unit 709 is configured to convert the defocus amount 704 into an object distance 710, and is described with reference to FIG. 9. FIG. 9 is a diagram for illustrating conversion from the image pickup plane distance to the object plane distance. Illustrated in FIG. 9 are a focused object plane 901, a lens 902, an image pickup plane 903, and an image pickup plane position 904 at which the image is defocused by a defocus amount 905. An in-focus object distance OBJ (0), an image pick up plane distance S(0) relative to a focused object, and an object distance OBJ (def), which is measured, are also illustrated in FIG. 9. Based on the lens equation, the following expressions are established respectively for the in-focus object distance OBJ (0) and the object distance OBJ (def), which is measured.

$$\frac{1}{OBJ(0)} + \frac{1}{S(0)} = \frac{1}{f} \quad (7)$$

$$\frac{1}{OBJ(def)} + \frac{1}{S(0)+def} = \frac{1}{f} \quad (8)$$

Based on Expressions (7) and (8), transformation in which OBJ(def) constitutes the left side member is performed to obtain the following expression.

$$OBJ(def) = \frac{(S(0)+def)*f}{(S(0)+def)-f} \quad (9)$$

Expression (9) can be used in the conversion from the defocus amount to the object distance. When the object distance 710 is output, the gradation conversion unit 711 performs data conversion suitable for where the object distance 710 is output to. The gradation conversion unit 711 outputs an object distance 712 on which gradation conversion has been performed (the output is referred to as "distance map output"). The gradation conversion is described with reference to FIG. 10 on the premise that an interface to the object distance output destination uses 8-bit (0 to 255) gradation in this embodiment.

Figure 10:
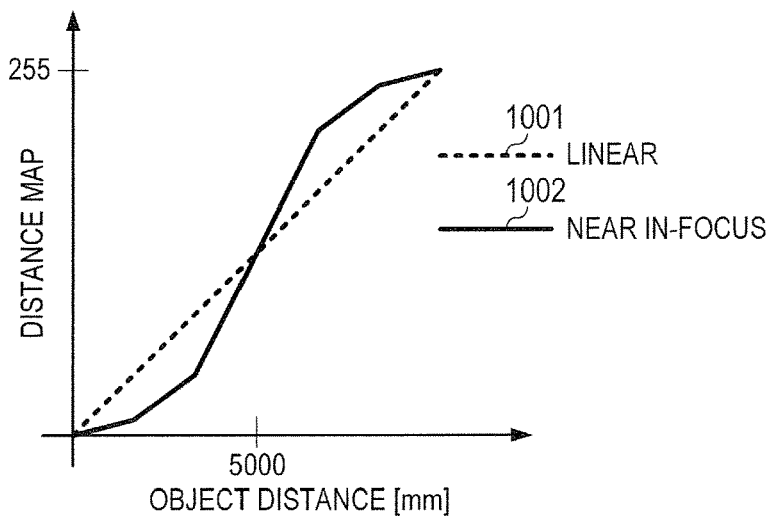
FIG. 10 is a graph for showing an example of gradation conversion characteristics in the image processing apparatus according to the second embodiment of the present invention.

FIG. 10 is a graph for showing an example of the conversion characteristics of conversion from the object distance to the distance map in the gradation conversion unit 711. In the example, the graph has an axis of abscissa that represents the object distance and an axis of ordinate that represents the distance map, and the distance to the focused object is 5,000 [mm]. In conversion characteristics 1001, linear gradation conversion is performed on the object distance 710. In conversion characteristics 1002, on the other hand, non-linear gradation conversion is performed on the object distance 710 so that more bits are allocated to an object distance around 5,000 [mm], which is near an in-focus region, than in other regions. In the case where the output destination of the object distance is an application that requires a wide distance measurement range as in Japanese Patent Application Laid-Open No. 2013-243529, linear gradation conversion having the conversion characteristics 1001 or the like is performed to allocate bits equally to any object distance. In the case where the output destination of the object distance is an application that requires distance resolution near the in-focus region as in Japanese Patent Application Laid-Open No. 2010-45457, on the other hand, non-linear gradation conversion having the conversion characteristics 1002 or the like is performed to allocate more bits to an object distance near the in-focus region than in other regions.

According to this embodiment, it is possible to provide the image processing apparatus and the image pickup apparatus capable of, when an object distance is output based on a defocus amount, outputting an object distance that has gradation characteristics suited to the output destination of the object distance. According to this embodiment, the object distance output by the image processing apparatus and the image pickup apparatus can therefore be used favorably where the object distance is output to.

[Third Embodiment]

A digital camera as an image pickup apparatus to which an image processing apparatus according to a third embodiment of the present invention is applied is described below. The configuration and the image pickup element of the digital camera as an example of the image pickup apparatus in this embodiment are the same as those described in the first embodiment with reference to FIGS. 1 and 2, and a description thereof is omitted here unless it is necessary. The third embodiment differs from the first embodiment in that a plurality of defocus map output destinations are provided.

Figure 12:
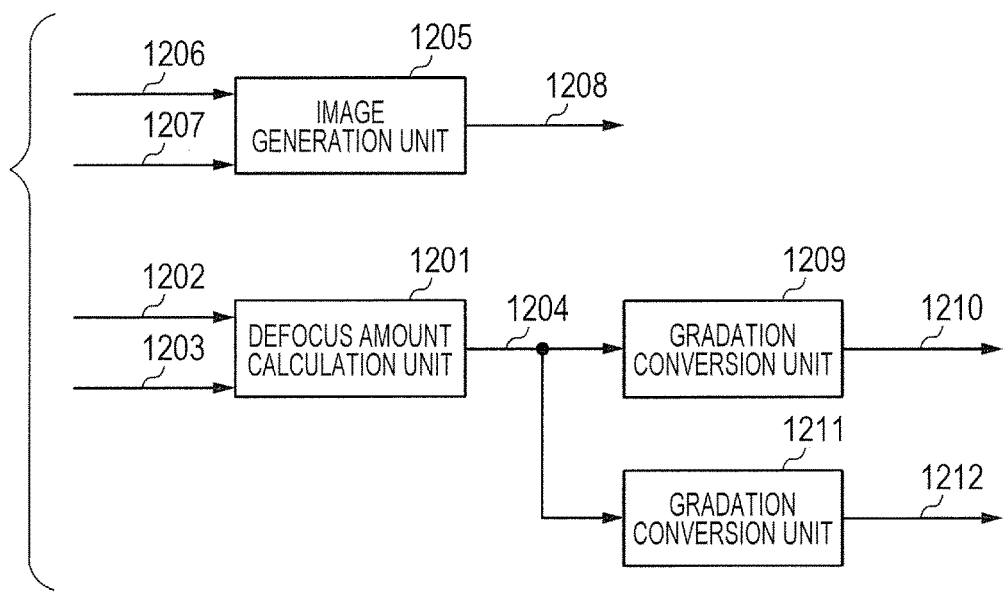
FIG. 12 is a block diagram of an image processing unit of an image processing apparatus according to a third embodiment of the present invention.

FIG. 12 is a diagram for illustrating an image generation unit, a defocus amount calculation unit, and a gradation conversion unit in the image processing unit 107 of the digital camera 100 to which the image processing apparatus according to this embodiment is applied.

In FIG. 12, the image generation unit 1205 adds together a plurality of object images formed from luminous fluxes that arrive from different regions of the pupil of the photographing optical system, and generates a single object image that is generated from luminous fluxes arriving from all regions of the pupil of the photographing optical system. An image A that is denoted by 1206 and an image B that is denoted by 1207 are input to the image generation unit 1205, and the image generation unit 1205 outputs an image 1208. The image 1208 generated by the image generation unit 1205 receives further processing such as white balance adjustment, color interpolation, reduction/enlargement, and filtering. The processed image is recorded on the recording medium 108 of FIG. 1 as a recorded image. The defocus amount calculation unit 1201 is configured to calculate a defocus amount at a target pixel position. The image A that is denoted by 1202 and the image B that is denoted by 1203 are input to the defocus amount calculation unit 1201, and the defocus amount calculation unit 1201 outputs a defocus amount 1204. The defocus amount calculation unit 1201 calculates the defocus amount by calculating a correlation function of correlation between the image A and the image B, or by other methods. The defocus amount is calculated through the same processing that has been described in the first embodiment. The defocus amount 1204 calculated by the defocus amount calculation unit 1201 is input to the gradation conversion units 1209 and 1211, respectively. When the defocus amount 1204 is output, the gradation conversion units 1209 and 1211 perform data conversion suitable to where the defocus amount 1204 is output to, by using different gradation characteristics from each other. The gradation conversion units 1209 and 1211 respectively output defocus maps 1210 and 1212 on which gradation conversion has been performed. The gradation conversion is described with reference to FIGS. 5A to 5D on the premise that an interface to each defocus map output destination uses 8-bit (0 to 255) gradation in this embodiment, and that the image processing unit 107 is connected to two output destinations. In the case where the output destination of the defocus map 1210 is an application that requires a wide distance measurement range as in Japanese Patent Application Laid-Open No. 2013-243529, the gradation conversion unit 1209 performs linear gradation conversion having the conversion characteristics 501 or the like to allocate bits equally to any defocus amount. In the case where the output destination of the defocus map 1212 is an application that requires distance resolution near the in-focus region as in Japanese Patent Application Laid-Open No. 2010-45457, on the other hand, the gradation conversion unit 1211 performs non-linear gradation conversion having the conversion characteristics 502 or the like to allocate more bits to a defocus amount near the in-focus region than in other regions.

While this embodiment gives an example in which two output units, specifically, two gradation conversion units, 1209 and 1211, are provided, the same processing can be performed also when more than two output units are provided. The gradation conversion characteristics are not limited to the conversion characteristics 501 of FIG. 5A and the conversion characteristics 502 of FIG. 5B, and may be suited to an application that is the output destination of the defocus amount as described in the first embodiment. The output units of the third embodiment may output the object distance, instead of the defocus amount, as described in the second embodiment. In an alternative mode, one of the output units outputs the defocus amount and the other output unit outputs the object distance.

According to this embodiment, it is possible to provide the image processing apparatus and the image pickup apparatus capable of, when a defocus amount and an object distance are output to a plurality of output destinations, outputting a defocus amount and an object distance that each have gradation characteristics suited to the output destination. According to this embodiment, the defocus amount output by the image processing apparatus and the image pickup apparatus can therefore be used favorably where the defocus amount or the like is output to.

[Fourth Embodiment]

A digital camera as an image pickup apparatus to which an image processing apparatus according to a fourth embodiment of the present invention is applied is described below. This embodiment gives an example in which distance information is output to an image processing application, the image processing application generates a processing parameter based on the distance information on which gradation conversion has been performed, and the image processing application performs processing of generating a virtual viewpoint image in which the background region of a photographed image is enlarged.

The digital camera as the image pickup apparatus to which the image processing apparatus according to the fourth embodiment of the present invention is applied is described below. The configuration of the digital camera as an example of the image pickup apparatus in this embodiment is the same as that described in the first embodiment with reference to FIGS. 1 and 2, and a description thereof is omitted here unless it is necessary.

The system configuration and processing of the digital camera as the image pickup apparatus to which the image processing apparatus of this embodiment is applied are described with reference to FIGS. 13A to 14E. As illustrated in FIG. 13A, the image processing unit 107 is provided with an image generation unit 1305, an object distance calculation unit 1301, a gradation conversion unit 1309, an image deformation parameter calculation unit 1311, and an image deformation unit 1313. Object distance information 1310 output from the gradation conversion unit 1309 is used to divide an object into regions in the image deformation unit 1313, and is used to calculate the magnification ratio of each object in the image deformation parameter calculation unit 1311. The transmission path word length of the object distance information 1310 is 8 bits (0 to 255). As illustrated in FIG. 13B, the image deformation unit 1313 includes a region dividing unit 1321, a region-specific deformation unit 1322, and an image synthesis unit 1323.

Figure 14A:
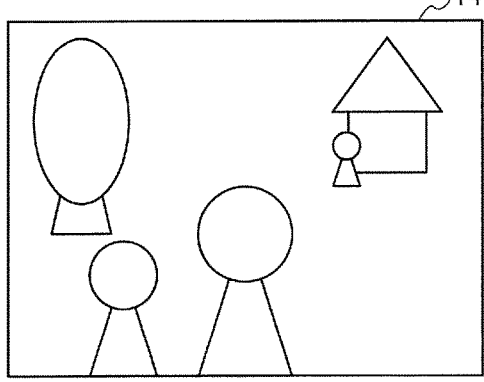
FIGS. 14A, 14B, 14C, 14D, and 14E are diagrams for illustrating image generation in the image processing apparatus according to the fourth embodiment of the present invention.
Figure 14B:
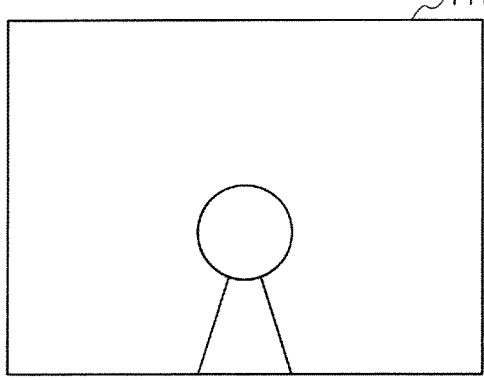
Figure 14C:
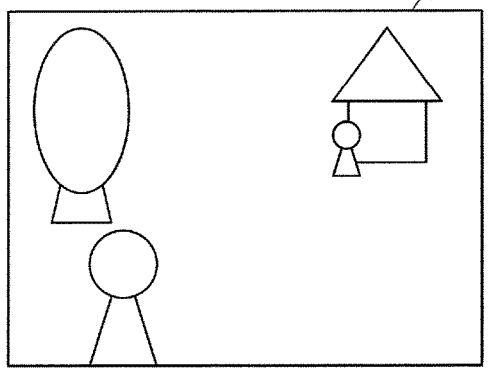
Figure 14D:
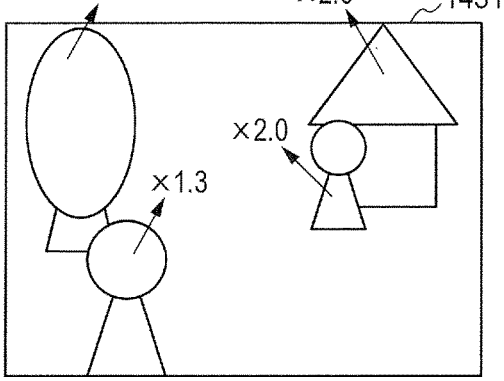
Figure 14E:
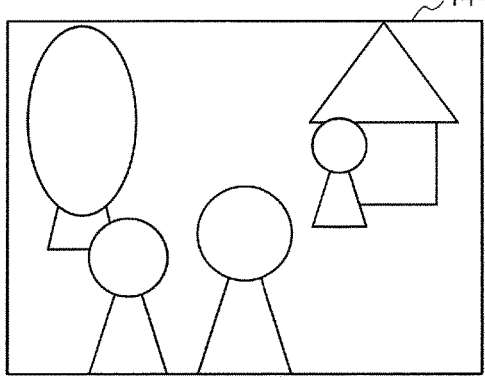

FIGS. 14A to 14E are diagrams for illustrating the processing configuration of the image pickup apparatus to which the image processing apparatus according to this embodiment is applied. Each step of the processing is described with reference to FIGS. 14A to 14E. FIG. 14A is a diagram of a photographed image 1401. The region dividing unit 1321 uses the object distance information 1310 to divide the photographed image 1401 illustrated in FIG. 14A, and generates an image 1411 (see FIG. 14B) of a region that is at the same distance as the in-focus distance (hereinafter referred to as "focused object region"), and an image 1421 (see FIG. 14C) of a plurality of background regions. Next, the regional deformation unit (deformation processing unit) 1322 calculates a magnification ratio for each background object based on the object distance information 1310, and generates a background enlarged image 1431 (see FIG. 14D). Lastly, the image synthesis unit 1323 combines the background enlarged image 1431 and the focused object image 1411 to generate an image 1441.

Figure 16:
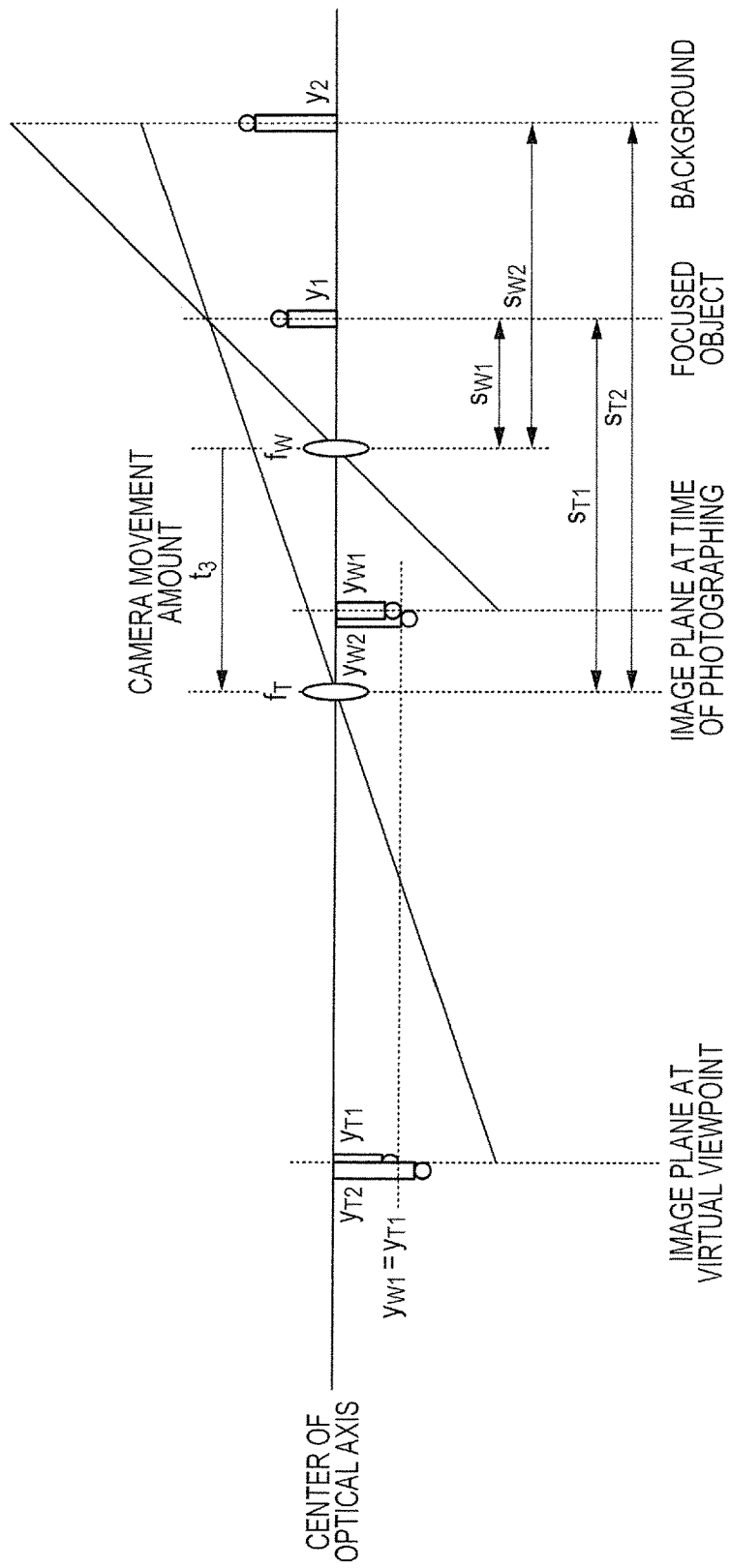
FIG. 16 is a diagram for illustrating the relation between the object distance and a background magnification ratio in the image processing apparatus according to the fourth embodiment of the present invention.

Image deformation parameters are described with reference to FIG. 16. For a simpler description, FIG. 16 takes as an example a case where a focused object and two objects in the background are photographed. Symbols in FIG. 16 represent the following.

$y_1$: the size of the focused object
$y_2$: the size of a background object
$f_w$: focal distance at the time of photographing
$y_{w1}$, $y_{w2}$: the size on the image plane at the time of photographing
$S_{w1}$, $S_{w2}$: the distance to an object at the time of photographing
$f_T$: focal distance from a virtual viewpoint
$y_{T1}$, $y_{T2}$: the size on the image plane of an object photographed from the virtual viewpoint
$S_{T1}$, $S_{T2}$: object distance from the virtual viewpoint
$t_3$: the amount of camera movement from a camera position at the time of photographing to a camera position at the virtual viewpoint To generate an image in which a background object is enlarged whereas the size of the focused object remains the same, the size $y_{T1}$ on the image plane of the focused object $y_1$ photographed from the virtual viewpoint is equal to the size $y_{w1}$ on the image plane of the focused object $y_1$ at the time of photographing. Therefore, based on the scaling relation between triangles and the lens equation, Expression (10) is established as an expression of the magnification ratio of a background.

$$\frac{y_{T2}}{y_{w2}} = \frac{f_T}{f_W} \frac{1}{\frac{s_{W1}}{s_{W2}}\left(\frac{f_T}{f_W} - 1\right) + 1} \quad (10)$$

Figure 15A:
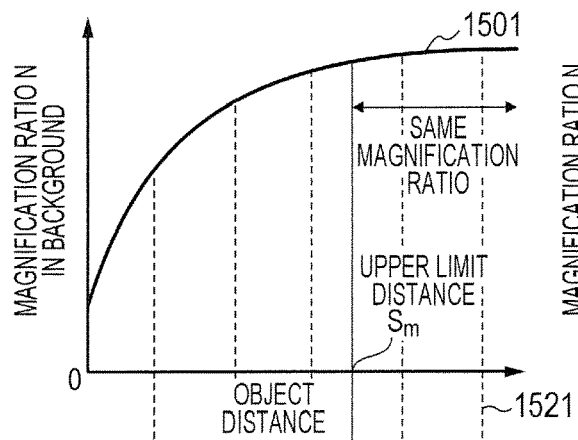
FIGS. 15A, 15B, 15C, and 15D are graphs for showing the relation between an object distance and a distance map in the image processing apparatus according to the fourth embodiment of the present invention.
Figure 15C:
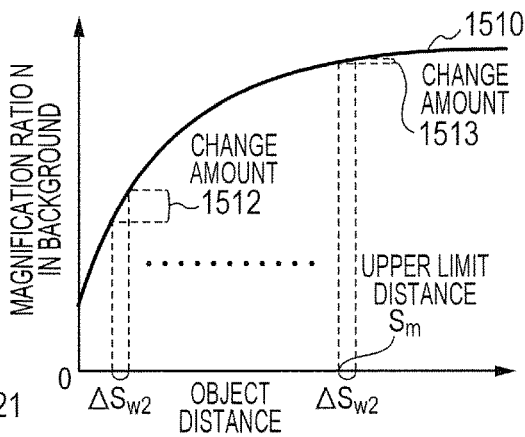
Figure 15B:
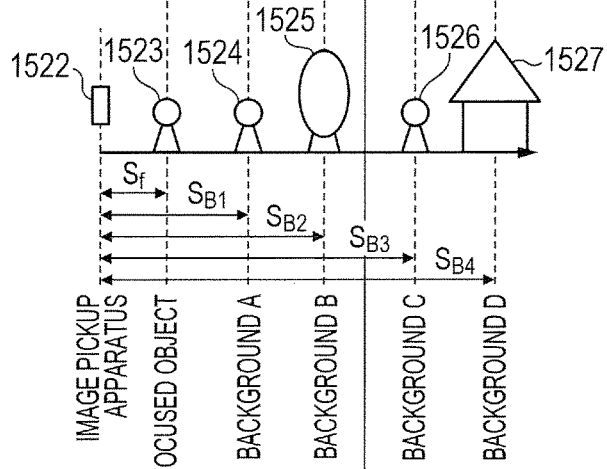
Figure 15D:
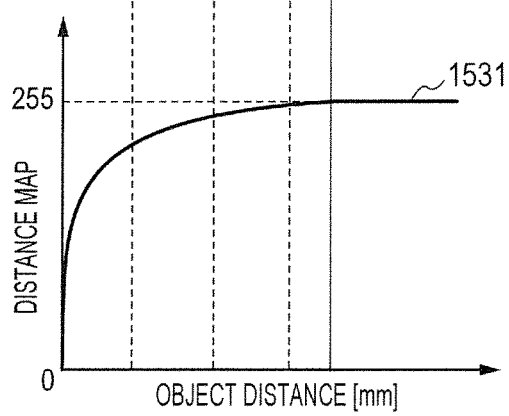

The magnification ratio of a background is defined as $N = y_{T2}/Y_{w2}$, and the background magnification ratio N is calculated from the focal distance $f_w$ at the time of photographing, the pieces of object distance information $S_{w1}$ and $S_{w2}$, and the virtual viewpoint focal distance $f_T$. This relation is described with reference to FIGS. 15A to 15D. FIGS. 15A, 15C, and 15D are graphs in each of which the axis of abscissa represents the background object distance, and the axis of ordinate represents the background magnification ratio. FIG. 15B is a diagram for illustrating an association relation between the photographed image 1401 of FIG. 14A and a variable magnification curve 1501 of FIG. 15A. The variable magnification curve 1501 of FIG. 15A is a graph that is plotted by taking the background object distance along the axis of abscissa and the background magnification ratio along the axis of ordinate. The variable magnification curve 1501 indicates that the value of the background magnification ratio converges when the distance grows to a certain level or more. Background objects that are farther than a prescribed distance can therefore be processed by magnification that uses the same magnification ratio. When the prescribed distance as a threshold for using the same magnification ratio for background objects that are located at the certain distance or more is defined as an upper limit distance $S_m$, the upper limit distance $S_m$ varies depending on the focal distance at the time of photographing, the virtual focal distance, and the object distance, and cannot be determined uniquely. The amount of change in magnification ratio is therefore used to determine the upper limit distance $S_m$, and a concrete description thereof is given with reference to FIG. 15C. A variable magnification curve 1510 of FIG. 15C is the same as the variable magnification curve 1501 of FIG. 15A. In FIG. 15C, the amount of change of the magnification ratio N with respect to a certain distance $\Delta S_{w2}$ is calculated, a distance at which the change amount is smaller than a prescribed value is searched for, and the found distance is determined as the upper limit distance $S_m$. A change amount 1513 is smaller than the prescribed value, whereas a change amount 1512 is larger than the prescribed value. A distance associated with the change amount 1513 is accordingly determined as the upper limit distance $S_m$. The prescribed value here is set in advance to a value that makes the difference in the amount of magnification ratio change visually noticeable.

Gradation conversion that is performed when the object distance information 1310 is output to the image deformation parameter calculation unit 1311 is described with reference to FIGS. 15A and 15D. FIG. 15D is a graph that has the object distance on the axis of abscissa and the distance map on the axis of ordinate. A variable magnification curve 1531 indicates gradation conversion in which the distance resolution is higher for an object that is in proximity to the image pickup apparatus and is accordingly large in the amount of magnification ratio change with respect to the object distance. In this gradation conversion, the distance resolution decreases gradually as the distance from the image pickup apparatus grows because the amount of magnification ratio change with respect to the object distance is smaller when the distance from the image pickup apparatus is greater. At an object distance that exceeds the upper limit distance $S_m$, a distance map value is output as the maximum value.

According to this embodiment, it is therefore possible to provide the image processing apparatus and the image pickup apparatus capable of outputting distance information that has gradation characteristics optimum for processing in which the distance information is used. According to this embodiment, the distance information or the like output by the image processing apparatus and the image pickup apparatus can therefore be used favorably where the information is output to.

[OTHER EMBODIMENTS]

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-167479, filed Aug. 20, 2014, which is hereby incorporated by reference herein in its entirety.

What is claimed is:

1. An image processing apparatus comprising:
one or more processors; and
a memory storing instructions which, when the instructions are executed by the processor, cause the image processing apparatus to function as:
an acquiring unit configured to acquire image signals of a plurality of images acquired by picking up an object image formed by a photographing optical system;
a determining unit configured to determine distance information of the object image by using the image signals of the plurality of images; and
a conversion unit configured to perform resolution conversion of converting resolution of the distance information and output a result of the resolution conversion,
wherein the conversion unit is configured to perform the resolution conversion of the distance information and output the result of the resolution conversion, by using a conversion characteristic that more gradations are allocated to distance information near an in-focus region as compared with distance information not near the in-focus region,
wherein the conversion unit is configured to perform the resolution conversion by selectively determining the conversion characteristic from a plurality of conversion characteristics, and
in case where an application for which distance resolution near the in-focus region is necessary is a destination of the output, the conversion unit is configured to determine the conversion characteristic as a conversion characteristic that more resolutions are allocated to the distance information near the in-focus region as compared with the distance information not near the in-focus region.

2. The image processing apparatus according to claim 1, wherein
the conversion unit is configured to perform the resolution conversion by selectively determining the conversion characteristic from the plurality of conversion characteristics, and
there is further provided a conversion characteristic that the gradations are asymmetrically allocated to distance information in front of and behind distance information of a focused object.

3. The image processing apparatus according to claim 1, wherein
the conversion unit is configured to perform the resolution conversion by selectively determining the conversion characteristic from the plurality of conversion characteristics, and
there is further provided a conversion characteristic that the resolution conversion varies depending on an F-value of a lens of the photographing optical system.

4. The image processing apparatus according to claim 1, wherein
the conversion unit is configured to perform the resolution conversion by selectively determining the conversion characteristic from the plurality of conversion characteristics, and
there is further provided a conversion characteristic that, in accordance with an F-value of a lens of the photographing optical system, as the F-value becomes larger, the gradations to be allocated to larger distance information are made fewer.

5. The image processing apparatus according to claim 1, wherein
the conversion unit is configured to perform the resolution conversion by selectively determining the conversion characteristic from the plurality of conversion characteristics, and
there is further provided a conversion characteristic that the resolution conversion varies depending on a base length in the pickup of the object image.

6. The image processing apparatus according to claim 1, wherein
the conversion unit is configured to perform the resolution conversion by selectively determining the conversion characteristic from the plurality of conversion characteristics, and
there is further provided a conversion characteristic that the resolution conversion varies depending on an ISO sensitivity in the pickup of the object image.

7. The image processing apparatus according to claim 1, wherein
the conversion unit is configured to perform the resolution conversion by selectively determining the conversion characteristic from the plurality of conversion characteristics, and
in a case where an application for which a relatively wider distance measurement range is necessary is a destination of the output, the conversion unit is configured to perform the resolution conversion of the distance information and output the result of the resolution conversion, by using a conversion characteristic that liner resolution conversion is to be performed.

8. The image processing apparatus according to claim 1, wherein
the distance information is information of an object distance,
the determining unit further comprises a generating unit configured to generate, as the distance information, the information of the object distance from a defocus amount acquired based on the image signals of the plurality of images, and
the conversion unit is configured to convert the object distance depending on the conversion characteristic.

9. The image processing apparatus according to claim 1, wherein
the conversion unit is configured to determine one or more conversion characteristics respectively for the distance information, convert the distance information depending on the respective conversion characteristics, and output a plurality of results acquired by the conversion.

10. The image processing apparatus according to claim 1, wherein
the image signals of the plurality of images include image signals of a plurality of images of the object image different from one another in blurring, image signals of a plurality of images acquired by picking up the object image from different regions of a pupil of the photographing optical system, or image signals of a plurality of images acquired by picking up an object with a plurality of image pickup units.

11. The image processing apparatus according to claim 1, wherein the distance information is based on a value indicating a degree of match between the plurality of images or a blurring evaluation value of the plurality of images.

12. The image processing apparatus according to claim 1, wherein
the distance information is information which is calculated from the image signals of the plurality of images and corresponds to an object distance of an object in the image.

13. The image processing apparatus according to claim 1, wherein
distance information converted using the conversion characteristic by the conversion unit is output as an object distance map.

14. The image processing apparatus according to claim 1, wherein
the distance information is information representing a defocus amount calculated from the image signals of the plurality of images.

15. The image processing apparatus according to claim 1, wherein
the distance information converted using the conversion characteristic by the conversion unit is output as a defocus map.

16. The image processing apparatus according to claim 1, further comprising
an image processing unit configured to perform an image process using distance information converted by the conversion unit.

17. The image processing apparatus according to claim 16, wherein
the image process includes image deformation process of deforming, by using distance information converted by the conversion unit, each region of the image depending on distance information.

18. An image processing apparatus comprising:
one or more processors; and
a memory storing instructions which, when the instructions are executed by the processor, cause the image processing apparatus to function as:
an acquiring unit configured to acquire image signals of a plurality of images acquired by picking up an object image formed by a photographing optical system;
a determining unit configured to determine distance information of the object image by using the image signals of the plurality of images; and
a conversion unit configured to perform resolution conversion of converting resolution of the distance information and output a result of the resolution conversion,
wherein the conversion unit configured to perform the resolution conversion of the distance information and output the result of the resolution conversion, by using a conversion characteristic that gradations are asymmetrically allocated to distance information in front of and behind distance information of a focused object.

19. An image processing apparatus comprising:
one or more processors; and
a memory storing instructions which, when the instructions are executed by the processor, cause the image processing apparatus to function as:
an acquiring unit configured to acquire image signals of a plurality of images acquired by picking up an object image formed by a photographing optical system;
a determining unit configured to determine distance information of the object image by using the image signals of the plurality of images; and
a conversion unit configured to perform resolution conversion of converting resolution of the distance information and output a result of the resolution conversion,
wherein the conversion unit is configured to perform the resolution conversion of the distance information and output the result of the resolution conversion, by using a conversion characteristic that resolution conversion varies depending on an F-value of a lens of the photographing optical system.

20. An image processing apparatus comprising:
one or more processors; and
a memory storing instructions which, when the instructions are executed by the processor, cause the image processing apparatus to function as:
an acquiring unit configured to acquire image signals of a plurality of images acquired by picking up an object image formed by a photographing optical system;
a determining unit configured to determine distance information of the object image by using the image signals of the plurality of images; and
a conversion unit configured to perform resolution conversion of converting resolution of the distance information and output a result of the resolution conversion,
wherein the conversion unit is configured to perform the resolution conversion of the distance information and output the result of the resolution conversion, by using a conversion characteristic that, in accordance with an F-value of a lens of the photographing optical system, as the F-value becomes larger, gradations to be allocated to larger distance information are made fewer.

21. An image processing apparatus comprising:
one or more processors; and
a memory storing instructions which, when the instructions are executed by the processor, cause the image processing apparatus to function as:
an acquiring unit configured to acquire image signals of a plurality of images acquired by picking up an object image formed by a photographing optical system;
a determining unit configured to determine distance information of the object image by using the image signals of the plurality of images; and
a conversion unit configured to perform resolution conversion of converting resolution of the distance information and output a result of the resolution conversion,
wherein the conversion unit is configured to perform the resolution conversion of the distance information and output the result of the resolution conversion, by using a conversion characteristic that resolution conversion varies depending on a base length in the pickup of the object image.

22. An image processing apparatus comprising:
one or more processors; and
a memory storing instructions which, when the instructions are executed by the processor, cause the image processing apparatus to function as:
an acquiring unit configured to acquire image signals of a plurality of images acquired by picking up an object image formed by a photographing optical system;
a determining unit configured to determine distance information of the object image by using the image signals of the plurality of images; and
a conversion unit configured to perform resolution conversion of converting resolution of the distance information and output a result of the resolution conversion,
wherein the conversion unit is configured to perform the resolution conversion of the distance information and output the result of the resolution conversion, by using a conversion characteristic that resolution conversion varies depending on an ISO sensitivity in the pickup of the object image.

23. An image processing method comprising:
acquiring image signals of a plurality of images acquired by picking up an object image formed by a photographing optical system;
determining distance information of the object image by using the image signals of the plurality of images; and
performing resolution conversion of converting resolution of the distance information and outputting a result of the resolution conversion,
wherein the resolution conversion of the distance information is performed and the result of the resolution conversion is output, by using a conversion characteristic that more gradations are allocated to distance information near an in-focus region as compared with distance information not near the in focus region,
wherein performing the resolution conversion includes selectively determining the conversion characteristic from a plurality of conversion characteristics, and
in a case where an application for which distance resolution near the in-focus region is necessary is a destination of the output, determining the conversion characteristic as a conversion characteristic that more resolutions are allocated to the distance information near the in-focus region as compared with the distance information not near the in-focus region.

24. An image processing method comprising:
acquiring image signals of a plurality of images acquired by picking up an object image formed by a photographing optical system;
determining distance information of the object image by using the image signals of the plurality of images; and
performing resolution conversion of converting resolution of the distance information and outputting a result of the resolution conversion,
wherein the resolution conversion of the distance information is performed and the result of the resolution conversion is output, by using a conversion characteristic that gradations are asymmetrically allocated to distance information in front of and behind distance information of a focused object.

25. An image processing method comprising:
acquiring image signals of a plurality of images acquired by picking up an object image formed by a photographing optical system;
determining distance information of the object image by using the image signals of the plurality of images; and
performing resolution conversion of converting resolution of the distance information and outputting a result of the resolution conversion,
wherein the resolution conversion of the distance information is performed and the result of the resolution conversion is output, by using a conversion characteristic that resolution conversion varies depending on an F-value of a lens of the photographing optical system.

26. An image processing method comprising:
acquiring image signals of a plurality of images acquired by picking up an object image formed by a photographing optical system;
determining distance information of the object image by using the image signals of the plurality of images; and
performing resolution conversion of converting resolution of the distance information and outputting a result of the resolution conversion,
wherein the resolution conversion of the distance information is performed and the result of the resolution conversion is output, by using a conversion characteristic that, in accordance with an F-value of a lens of the photographing optical system, as the F-value becomes larger, gradations to be allocated to larger distance information are made fewer.

27. An image processing method comprising:
acquiring image signals of a plurality of images acquired by picking up an object image formed by a photographing optical system;
determining distance information of the object image by using the image signals of the plurality of images; and
performing resolution conversion of converting resolution of the distance information and outputting a result of the resolution conversion,
wherein the resolution conversion of the distance information is performed and the result of the resolution conversion is output, by using a conversion characteristic that resolution conversion varies depending on a base length in the pickup of the object image.

28. An image processing method comprising:
acquiring image signals of a plurality of images acquired by picking up an object image formed by a photographing optical system;
determining distance information of the object image by using the image signals of the plurality of images; and
performing resolution conversion of converting resolution of the distance information and outputting a result of the resolution conversion,
wherein the resolution conversion of the distance information is performed and the result of the resolution conversion is output, by using a conversion characteristic that resolution conversion varies depending on an ISO sensitivity in the pickup of the object image.

* * * * *